United States Patent [19]

Lingnau

[11] 4,009,860
[45] Mar. 1, 1977

[54] SHUTOFF VALVE FOR HIGH-PRESSURE SPRAY GUNS

[75] Inventor: Horst Lingnau, Rheinhausen, Germany

[73] Assignee: Woma-Apparatebau Wolfgang Maasberg & Co. GmbH, Rheinhausen, Germany

[22] Filed: May 19, 1975

[21] Appl. No.: 579,086

[30] Foreign Application Priority Data

May 18, 1974 Germany .......................... 2424321

[52] U.S. Cl. .................................. 251/44; 251/251
[51] Int. Cl.² ...................................... F16K 31/383
[58] Field of Search .......................... 251/44, 251

[56] References Cited

UNITED STATES PATENTS

| | | | |
|---|---|---|---|
| 685,930 | 11/1901 | Netherly | 251/44 |
| 796,005 | 8/1905 | O'Brien | 251/44 |
| 1,250,388 | 12/1917 | Titus | 251/44 X |
| 1,711,660 | 5/1929 | Stephenson | 251/251 X |
| 2,758,811 | 8/1956 | Peterson | 251/44 X |

FOREIGN PATENTS OR APPLICATIONS

| | | | |
|---|---|---|---|
| 332,770 | 3/1935 | Italy | 251/44 |
| 362,527 | 5/1938 | Italy | 251/44 |
| 65,399 | 7/1913 | Switzerland | 251/44 |

*Primary Examiner*—Arnold Rosenthal
*Attorney, Agent, or Firm*—Karl F. Ross; Herbert Dubno

[57] ABSTRACT

A shutoff-valve, for high and highest pressures (i.e. pressure in the range of hundreds to thousands of kp/cm²) especially for a high-pressure spray gun, has a common pressure chamber for a differential piston driven by the pressure medium (e.g. liquid or gas) and a control piston of either ball-, cone-, cylinder-, plate-, or similar shape. The control piston cooperates with a control pin displaced by an operating lever. The shutoff-valve, working on a largely hydraulic basis by creating underpressure, is brought into closing position by means of a bypass channel for controlled flow of the medium and is opened by displacement of the operating lever.

8 Claims, 5 Drawing Figures

SHUTOFF VALVE FOR HIGH-PRESSURE SPRAY GUNS

FIELD OF THE INVENTION

The present invention relates to a shutoff-valve for high and highest pressures (e.g. pressures in the range of hundreds to thousands of kp/cm$^2$) especially for use in high-pressure spray guns.

Background of the Invention

Shutoff valves for high and highest pressures, (i.e. pressures of hundred to thousands of kp/cm$^{22}$, where 1 kp= 1 kilogram - force), especially for high-pressure spray guns are known in different types. They, for example, may have a common pressure chamber, a differential piston, driven by a pressure medium which can be shut off (e.g. a liquid or a gas) and a control piston with an operating device. The differential piston located in a cylinder of the valve housing, between an inlet and an outlet for the pressure medium can be urged against a seat adjacent the outlet. The control piston is located (with respect to the direction of flow) behind the differential piston. The outer wall of the differential piston and the inner wall of the cylinder form a throttle path leading from the inlet for the pressure medium into the pressure chamber.

In a known device, the differential piston has an axially extending throughgoing bore and, on the opposite side of the seat for the differential piston, a valve seat. A shiftable control piston can be urged against this valve seat by means of an operating mechanism and is in closed position when pressed against the valve seat and thereby block the axial throughgoing bore. For this purpose the operating mechanism has a piston stem connected to the control piston. The piston stem is encircled by a compression spring which bears against the control piston. Hence the closing force in conventional devices results from the spring force of the spring used. This in turn leads to a rather high opening and holding forces which, in the case of high-pressure spray guns, must be provided manually by the operator.

Objects of the Invention

It is therefore an object of the present invention to provide an improved, easily operated shutoff-valve for elevated pressures especially of the magnitudes described for high-pressure spray guns.

Another objects is to provide a shutoff-valve without the compression spring known in prior arts, but working on a largely hydraulic basis instead.

Still another object is to provide a shutoff-valve which requires relatively small opening and holding forces, and which is of very simple construction, and high effectiveness and has a quick response.

Summary of the Invention

These objects are attained according to the present invention by providing a shutoff valve for elevated pressures of the magnitude described, especially for high-pressure spray guns comprising a differential piston for controlling the flow of a high-pressure medium, a control piston for regulating the differential piston, and an operating mechanism for displacing the control piston.

The differential piston, driven by the pressure medium which can be shut off, is shiftable in a cylinder of the valve housing between an inlet-pipe connection (inlet) and an outlet-pipe connection (outlet) for the pressure medium and works against a seat arranged at the outlet-pipe connection.

The control piston, in a common pressure chamber with the differential piston, is located behind the differential piston with respect to the flow direction and a throttle path is formed between the outer wall of the differential piston and the inner wall of the cylinder, leading from the inlet of the pressure medium into the pressure chamber.

According to the present invention the differential piston is separated from the control piston by the pressure chamber. The control piston as well as the differential piston are originally in "closed" positions under the force of the pressure medium coming from the direction of the pressure chamber. By pushing the operating mechanism into its "open"position a bypass channel, formed in the valve housing and having an outlet ahead of the seat of the differential piston (with respect to the flow direction), is opened.

The opening of the bypass channel connects the outlet to the pressure chamber, effecting a drop of pressure in the pressure chamber below the pressure present in the pressure-medium entry area between the differential piston and seat.

Because the effective cross sectional area of the differential piston in the entry area of the pressure medium is smaller than its effective cross sectional area in the area of the pressure chamber, the differential piston is pushed back during this drop of pressure in the pressure chamber and lifts itself from its seat.

As soon as the operating mechanism sets the control piston free again, the control piston is pushed back into its closing position by the pressure prevailing in the pressure chamber. Hence the bypass channel is shut off and equalization of pressure between the pressure chamber and the outlet-pipe connection is terminated.

The pressure medium entering the pressure chamber via the throttle path creates a new high pressure in the pressure chamber and, because of pressure buildup behind the differential piston, the differential piston is pushed back into its closing position.

In the entry area of the pressure medium the differential piston is formed as a cone-shaped valve and its effective cross section is smaller than in the area of the throttle path leading to the pressure chamber.

The present invention also provides the following features: a valve body with one or more valve channels between pressure chamber and bypass channel is assigned to the control piston. The valve channel or channels can be blocked off by the control piston. The control valve body is received without leakage in a cylinder bore of the valve housing.

In principle the control piston can also be installed directly in the valve housing without having a separate valve body. The present invention provides a control pin as an operating device for the control piston; said control pin when acted upon by an operating lever pushes the control piston into its open position.

The operating lever, constructed as a trigger lever, is operated manually when the shutoff-valve of the present invention is used in a high-pressure spray gun, but can also be used in other hydraulic systems as a lever which is mechanically or hydraulically operated.

The control pin is installed pressure right, preferably in a centric valve channel, in the valve body and tightly sealed against the latter. The control piston can be formed as a ball-shaped, cone-shaped, cylinder-shaped, plate-shaped or similar shaped solid body. Advantageously the control pin and control piston form a structural unit.

The cross section of the control piston is considerably smaller than the cross section of the control piston in the area of the throttle path. Despite the elevated pressures, pushing of the control piston into the open position by means of the operating mechanism does not create any difficulties, i.e. it does not require too high a force and thereby makes manual operation easy as is needed for handling high-pressure spray guns.

The advantage of the present invention is that the shutoff-valve for elevated pressures, especially for a high-pressure spray gun, is of very simple construction and high effectiveness.

In fact the shutoff-valve of the present invention, in its opening and closing movements with respect to the differential piston, works on a largely hydraulic basis. Only the opening movement for the control piston is derived on a mechanical basis.

Thus the major part of the force for the opening movement of the control piston is hydraulic so that the mechanical force is relatively small; the holding forces, meaning the forces necessary to keep the control piston and also automatically the differential piston in open position, are hydraulic and provided by the high pressure of the medium. Beyond the aforementioned advantages the shutoff-valve of the present invention distinguishes itself through quick response time, the movements of the opening and closing can be quickly released.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
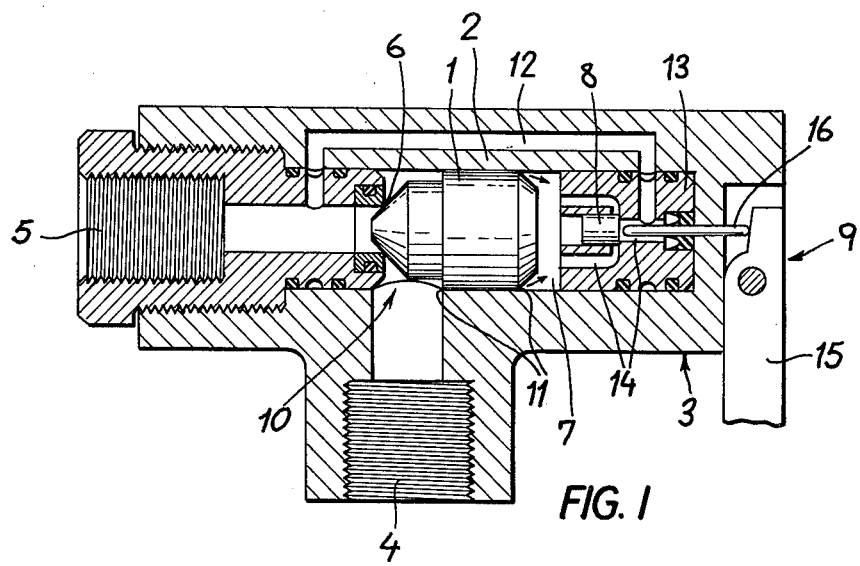
FIG. 1 is a longitudinal cross section of a shutoff-valve in closed position.
Figure 2:
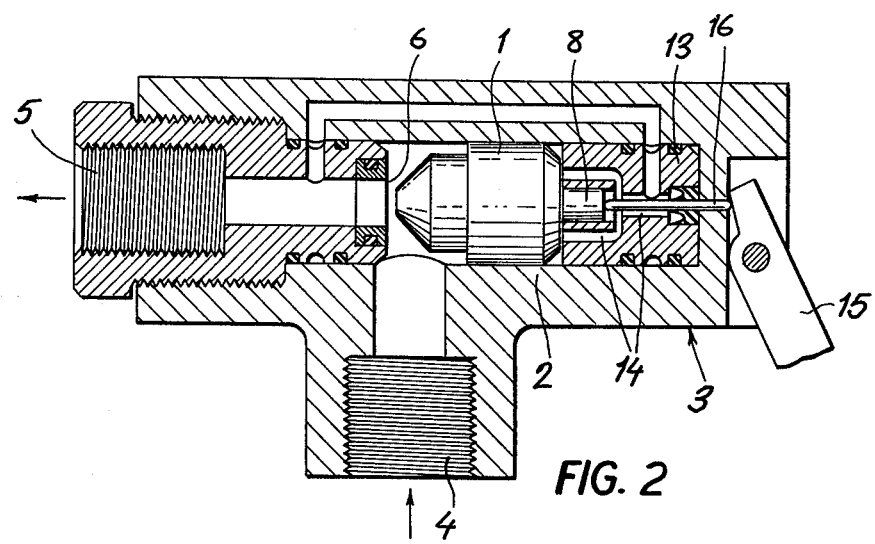
FIG. 2 is a longitudinal cross section of the same shutoff-valve as shown in FIG. 1 but in open position.

FIG. 1 and FIG. 2 show a shutoff-valve for elevated pressures of the magnitude described, especially for high-pressure spray guns.

The general construction of this shutoff-valve as shown in FIGS. 1 and 2 comprises a differential piston 1 and a control piston 8. The differential piston 1 is impelled by a pressure medium, which can be shut off.

The differential piston 1 is located in a cylinder 2 of a valve housing 3 between an inlet-pipe connection (inlet) 4 and an outlet-pipe connection (outlet) 5 for the pressure medium and is urged against a seat 6 assigned to the outlet-pipe connection 5.

Control piston 8 with an associated operating device 9 is located, with respect to the direction of flow, behind the differential piston 1 in a common pressure chamber 7, whereby between the outer wall of the differential piston 1 and the inner wall of cylinder 2 a throttle path 11 is formed leading from the entry area 10 of the pressure medium into the pressure chamber 7. The differential piston 1 is separated from piston rod 8 by pressure chamber 7.

Differential piston 1 and control piston 8 are, because of pressure created by the pressure medium and coming from the side of the pressure chamber 7, in closed position, and are moved to an "open" position by means of the operating device 9. Thus a bypass channel 12 is unblocked.

The bypass channel 12 is located in a valve housing 3, opening in front of seat 6 (in the flow direction) and behind the control piston 8. By this bypass channel 12, the outlet-pipe connection 5 is connected to pressure chamber 7.

Upon opening of the bypass channel 12 pressure chamber 7 and outlet-pipe connection 5 are connected and a drop of pressure below the pressure in entry area 10 between differential piston 1 and seat 6 is created. Hence differential piston 1 is pushed back into the open position.

When operating device 9 releases control piston 8, the latter is pushed back into its closed position by the pressure still present in pressure chamber 7.

Through the throttle path 11 between the outer wall of the differential piston 1 and the inner wall of the cylinder 2, a pressure buildup takes place in pressure chamber 7, which exceeds the pressure presently in entry area 10, until finally the differential piston 1 is again shifted into its closed position and therewith is pressed back onto seat 6.

Differential piston 1 has a smaller cross section in the entry area 10 of the pressure medium than in the area of the throttle path leading to pressure chamber 7.

Control piston 8 is received in a valve body 13 which is inserted pressure tight into cylinder 2 of valve housing 3. The valve body 13 has one or more valve channels 14 which lead from the pressure chamber 7 to the bypass channel 12 and which can be shut off by control piston 8.

Control piston 8 furthermore has, as an operating device, a control pin 16 which, when engaged by operating lever 15, shifts control piston 8 into its open position.

Figure 3:
FIGS. 3 – 5 are elevational views of valve members according to the invention.
Figure 5:
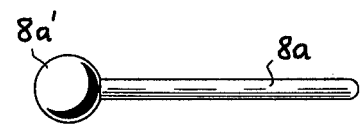
Figure 4:
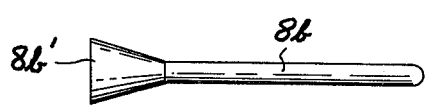

In a high-pressure spray gun, lever 15 is constructed as a trigger handle. Control pin 16 is guided pressure tight in the valve body 13 by a central valve channel. Control pin 16 need not only be constructed as a solid cylindrical body, but also as a ball-shaped, cone-shaped, or plate-shaped solid body as shown in FIGS. 3 - 5. The stem 8a, 8b or 8c is connected to the valve body 8a', 8b' or 8c', respectively. Control pin 16 can likewise form a structural unit with control piston 8. The cross section of control piston 8 is chosen to be considerably smaller than the cross section of the differential piston 1, to be able to use the smallest operating force possible with regard to the elevated pressures.

I claim:

1. A valve assembly for a high-pressure medium, especially for a high-pressure spraygun comprising:
    a valve housing formed with an outlet for said medium, an inlet for said medium spaced from said outlet, and a cylinder bore between said inlet and said outlet, said cylinder bore having a rear wall remote from said outlet;
    a valve seat formed in said cylinder bore at said outlet;
    a differential piston slidably received in said cylinder bore and having a front end engageable with said seat to block flow of said medium from said inlet to said outlet, said differential piston having a rear end defining a pressure chamber in said cylinder bore, rearwardly of said seat, said piston further defining with the wall of said cylinder bore a throttle path between said inlet and said chamber;

a bypass passage formed in said housing and communicating between said outlet ahead of said seat and said chamber;

a control piston shiftable in said housing between a blocking position interupting communication between said chamber and said passage and an open position communicating said passage with said chamber; and an operating mechanism on said housing for displacing said control piston between said blocking position thereby enabling said medium to shift said differential piston away from said seat, and for releasing said control piston to permit pressure in said chamber to displace said control piston into said blocking position whereby fluid pressure is increased in said chamber through said passage and said medium thereby displaces said differential piston into contact with said seat, said operating mechanism comprising:

a valve body sealingly received in said cylinder bore behind the rear end of said differential piston and ahead of said rear wall and formed with at least one channel communicating between said chamber and said passage, said control piston being wholly received in and shiftable in said body to selectively block and unblock said channel;

a pin sealingly received in said body and shiftable therein to displace said control piston, and a lever on said housing engageable with said pin for shifting same.

2. The valve defined in claim 1 wherein said housing is formed with a central bore axially aligned with said cylinder bore and guiding said pin.

3. The valve defined in claim 1 wherein said pin is affixed to said control piston.

4. The valve defined in claim 1 wherein said pin is separate from and bears upon said control piston.

5. The valve defined in claim 1 wherein said control piston is a cylindrical body.

6. The valve defined in claim 1 wherein said control piston is a ball-shaped body.

7. The valve defined in claim 1 wherein said control piston is a plate-shaped body.

8. The valve defined in claim 1 wherein said control piston is a cone-shaped body.

* * * * *